(12) United States Patent
Chen et al.

(10) Patent No.: US 10,012,786 B2
(45) Date of Patent: Jul. 3, 2018

(54) BACKLIGHT MODULES AND DISPLAY DEVICES

(71) Applicant: Wuhan China Star Optoelectronics Technology Co., Ltd., Wuhan, Hubei (CN)

(72) Inventors: Qian Chen, Guangdong (CN); Zhongjie Liu, Guangdong (CN); Bin Xiong, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 82 days.

(21) Appl. No.: 15/173,296

(22) Filed: Jun. 3, 2016

(65) Prior Publication Data

US 2017/0212296 A1 Jul. 27, 2017

(30) Foreign Application Priority Data

Jan. 26, 2016 (CN) .......................... 2016 1 0051211

(51) Int. Cl.
*F21V 7/04* (2006.01)
*F21V 8/00* (2006.01)

(52) U.S. Cl.
CPC .......... *G02B 6/0053* (2013.01); *G02B 6/0051* (2013.01); *G02B 6/0088* (2013.01)

(58) Field of Classification Search
CPC ... G02B 6/0053; G02B 6/0051; G02B 6/0088
See application file for complete search history.

(56) References Cited

U.S. PATENT DOCUMENTS

| | | | | |
|---|---|---|---|---|
| 2010/0053993 | A1* | 3/2010 | Hong | G02B 6/0011 362/606 |
| 2012/0002437 | A1 | 1/2012 | Yabe | |
| 2013/0242600 | A1* | 9/2013 | Franklin | G02B 6/0073 362/602 |
| 2014/0111743 | A1* | 4/2014 | Takemura | F21S 2/00 349/64 |
| 2015/0241624 | A1* | 8/2015 | Lo | G02B 6/0088 362/611 |

FOREIGN PATENT DOCUMENTS

| | | |
|---|---|---|
| CN | 202452309 U | 9/2012 |
| CN | 203757522 U | 8/2014 |
| CN | 204964951 U | 1/2016 |

* cited by examiner

*Primary Examiner* — Evan Dzierzynski
(74) *Attorney, Agent, or Firm* — Andrew C. Cheng

(57) ABSTRACT

A backlight module includes a lamp set, a light guiding plate, a diffuser, a top prism sheet, and a down prism sheet. The diffuser includes a first end and a second end opposite to each other, the first end of the diffuser is closer to the lamp set than the second end, and the diffuser includes a first end and a second end opposite to each other. The diffuser includes the overlapped portion stacked with the top/down prism sheets and the extended portion extending from the overlapped portion. On the first end of the diffuser, the light beams emitted by the light guiding plate may be processed by the first extended portion, instead of being emitted out directly. This can avoid the bright lines occurred by the backlit so as to reduce the optical leakage. In addition, a display device is also disclosed.

2 Claims, 6 Drawing Sheets

BACKLIGHT MODULES AND DISPLAY DEVICES

FIELD OF THE INVENTION

The present invention relates to display device technology field, and more particularly to a backlight module and a display device.

BACKGROUND OF THE INVENTION

Backlight modules are configured to display backlit for display modules within display devices. The light-emitting performance of the backlight module may directly affect the display performance of the display module.

Referring to FIG. 1, a conventional backlight module 1 includes a light emitting diode (LED) lamp set 101, a light guiding plate 102, a diffuser 103, a top prism sheet 104, and a down prism sheet 105. The top prism sheet 104 and the down prism sheet 105 are respectively stacked on the diffuser 103. FIGS. 2-4 are schematic views of the diffuser 103, the top prism sheet 104, and the down prism sheet 105. The diffuser 103 includes a protrusive portion 1031 arranged in a front section. The down prism sheet 105 includes two ear portions 1051 arranged in the front section. Referring to FIG. 5, when the components are stacked, a black single-sided adhesive may be adhered to the protrusive portion 1031 of the diffuser 103 and the ear portions 1051 of the down prism sheet 105. The down prism sheet 105 may be fixed by the two ear portions 1051. However, there are two gaps between the protrusive portion 1031 of the diffuser 103 and the two ear portions 1051. On one end of the diffuser 103 close to the lamp set 101, the light beams emitted by the light guiding plate 102 may pass through the gaps to arrive a display panel, which may result the light leakage as indicated by arrow A in FIG. 5. As such, the bright lines may exist on the display panel and the display performance of the display device may be affected.

SUMMARY OF THE INVENTION

In one embodiment, the backlight module may avoid the light leakage, and the films may be effectively fixed.

In one aspect, a backlight module includes: a lamp set, a light guiding plate, a diffuser, a top prism sheet, a down prism sheet, and a plastic frame, the light guiding plate includes a light-emitting surface, a back surface opposite to the light-emitting surface, and a lateral surface connecting the light-emitting surface and the back surface, the lamp set is arranged to be close to the lateral surface of the light guiding plate to emit light beams to the light guiding plate, the diffuser, the down prism sheet, and the top prism sheet are stacked on the light-emitting surface in sequence, the diffuser includes a first end and a second end opposite to each other, the first end of the diffuser is closer to the lamp set than the second end, the diffuser includes a first end and a second end opposite to each other, the first end of the diffuser is closer to the lamp set than the second end, the diffuser includes a first overlapped portion and a first extended portion, the down prism sheet and the top prism sheet are stacked on the first overlapped portion, the first extended portion extends outward from an edge of the first overlapped portion to prevent the light beams from the light guiding plate from being leaked via the first end of the diffuser.

Wherein the diffuser, the top prism sheet, and the down prism sheet are rectangular and planar.

Wherein on the first end of the diffuser, an end surface of the top prism sheet facing toward the lamp set aligns with the end surface of the down prism sheet facing toward the lamp set along a vertical direction.

Wherein the lamp set includes at least one LED and a fixing board for fixing the LED, and the LED is arranged on a lateral surface of the light guiding plate.

Wherein the backlight module further includes a plastic frame for fixing the backlight module, and the first end of the diffuser connects with the fixing board of the lamp set or the plastic frame.

Wherein the down prism sheet includes a second overlapped portion and a second extended portion, the second overlapped portion is arranged between the diffuser and the top prism sheet, the second extended portion extends outward from the edge of the second overlapped portion, and the second extended portion is fixed on the plastic frame via glue.

In another aspect, a display device includes the above backlight module.

In view of the above, the diffuser includes the overlapped portion stacked with the top/down prism sheets and the extended portion extending from the overlapped portion. On the first end of the diffuser, the light beams emitted by the light guiding plate may be processed by the first extended portion, instead of being emitted out directly. This can avoid the bright lines occurred by the backlit so as to reduce the optical leakage.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
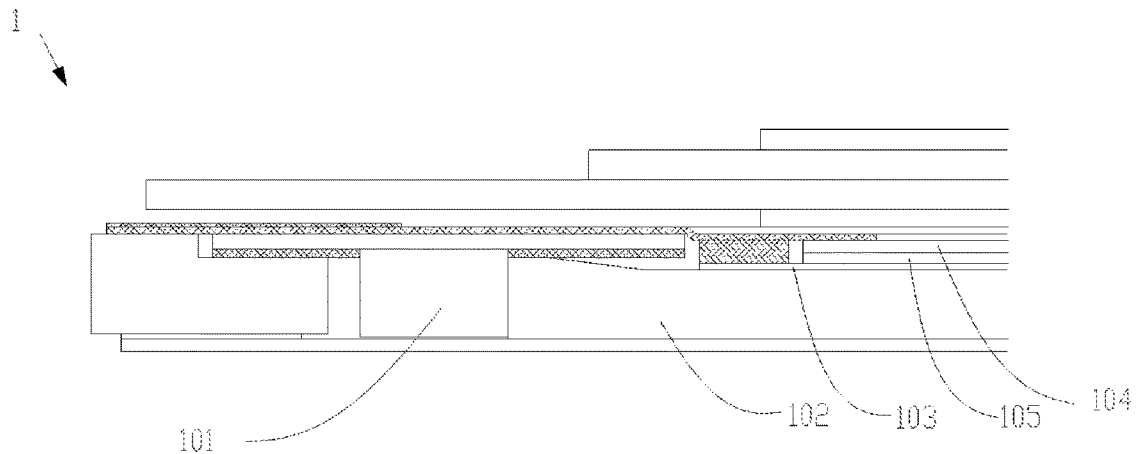
FIG. 1 is a cross-sectional view of one conventional backlight module at the LED side.
Figure 2:
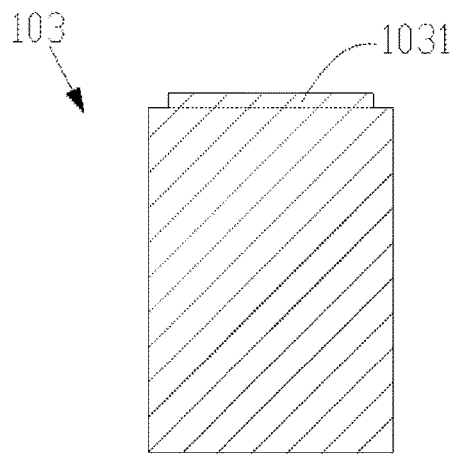
FIG. 2 is a schematic view of one conventional diffuser.
Figure 3:
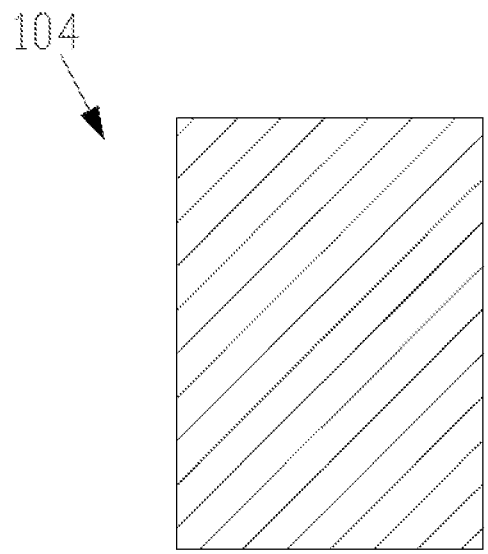
FIG. 3 is a schematic view of one conventional top prism sheet.
Figure 4:
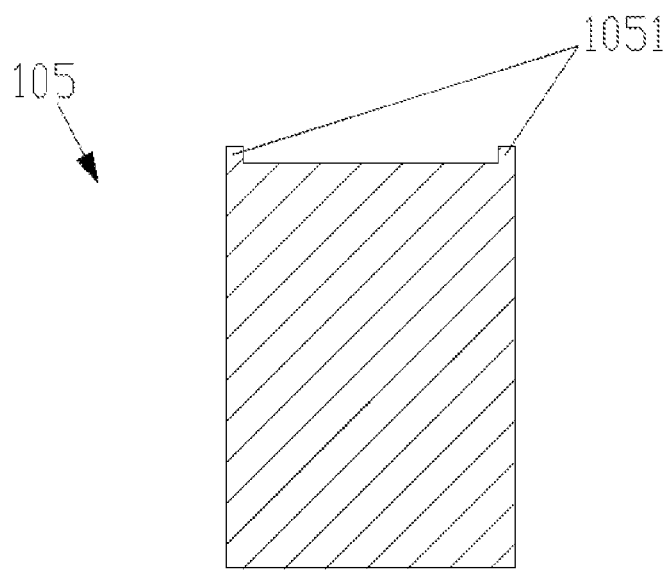
FIG. 4 is a schematic view of one conventional down prism sheet.
Figure 5:
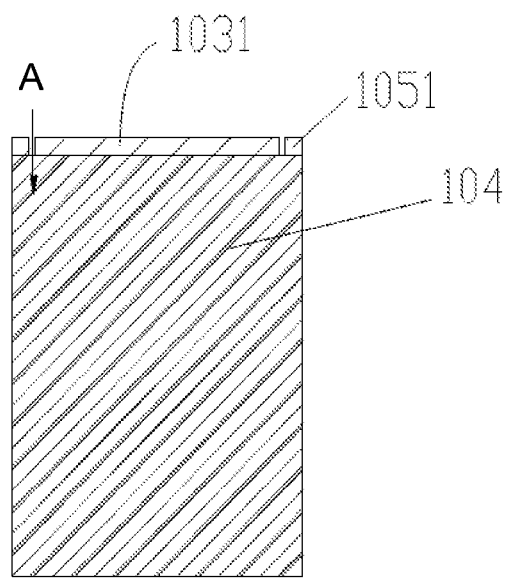
FIG. 5 is a schematic view showing the stacked conventional diffuser and top/down prism sheets.
Figure 6:
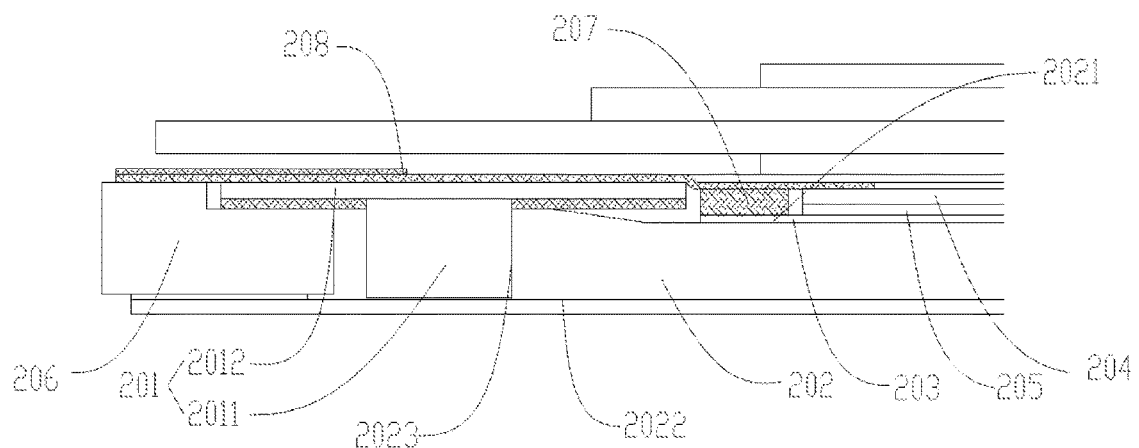
FIG. 6 is a cross-sectional view of the backlight module at the LED side in accordance with one embodiment.

Referring to FIG. 6, the backlight module 2 includes a lamp set 201, a light guiding plate 202, a diffuser 203, a top prism sheet 204, a down prism sheet 205, and a plastic frame 206. In the embodiment, the backlight module is of the edge-lit type. The lamp set 201 includes a LED 2011 and a fixing board 2012 for fixing the LED 2011, and the fixing board 2012 is arranged above the lamp set 201. It can be understood that the lamp set 201 may adopt light sources other than the LED, such as Cathode Fluorescent Lamp (CCF). The fixing board 2012 may be made by Flexible Printed Circuit (FPC) materials.

The light guiding plate 202 is configured to lead out the light beams emitted from the lamp set 201. The light guiding plate 202 includes a light-emitting surface 2021, a back surface 2022 opposite to the light-emitting surface 2021, and a lateral surface 2023 connecting the light-emitting surface 2021 and the back surface 2022. The lamp set 201 is arranged to be close to the lateral surface 2023 of the light guiding plate 202 to emit the light beams to the light guiding plate 202. The diffuser 203, the down prism sheet 205, and the top prism sheet 204 are stacked on the light-emitting surface 2021 of the light guiding plate 202 in sequence.

The diffuser 203 is configured for diffusing the light beams lead out by the light guiding plate 202 to obtain uniform light beams. The diffuser 203 includes a first end and a second end opposite to each other. The first end of the diffuser 203 is closer to the lamp set 201 than the second end.

The down prism sheet 205 is arranged on the diffuser 203, and the top prism sheet 204 is arranged on the down prism sheet 205. The top prism sheet 204 and the down prism sheet 205 are configured for collecting the light beams diffused by the diffuser 203 to enhance the brightness of the light beams.

Figure 7:
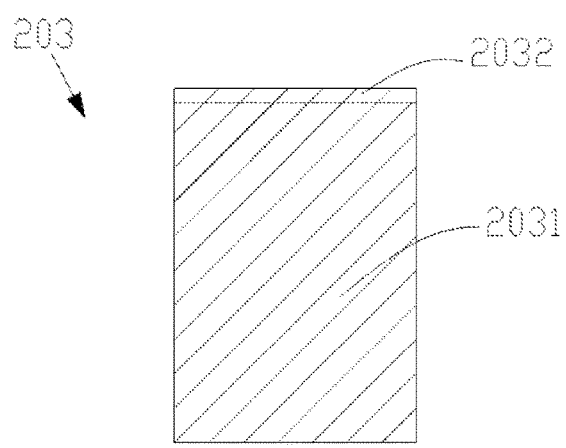
FIG. 7 is a schematic view of the diffuser in accordance with one embodiment.
Figure 8:
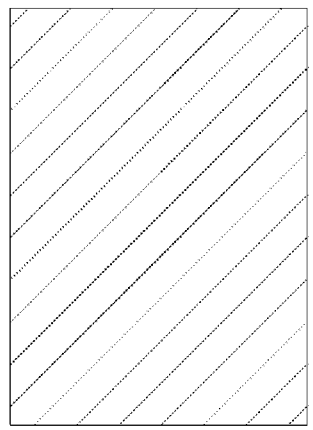
FIG. 8 is a schematic view of the top prism sheet in accordance with one embodiment.
Figure 9:
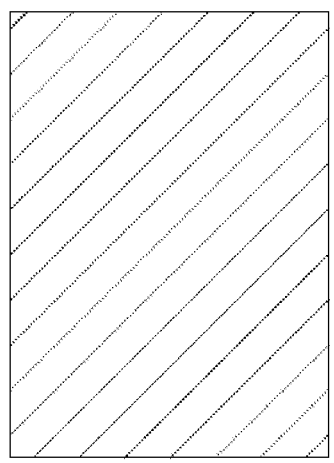
FIG. 9 is a schematic view of the down prism sheet in accordance with one embodiment.

Referring to FIGS. 7-9, the diffuser 203, the top prism sheet 204, and the down prism sheet 205 are rectangular and planar. The diffuser 203 includes a first overlapped portion 2031 and a first extended portion 2032.

Figure 10:
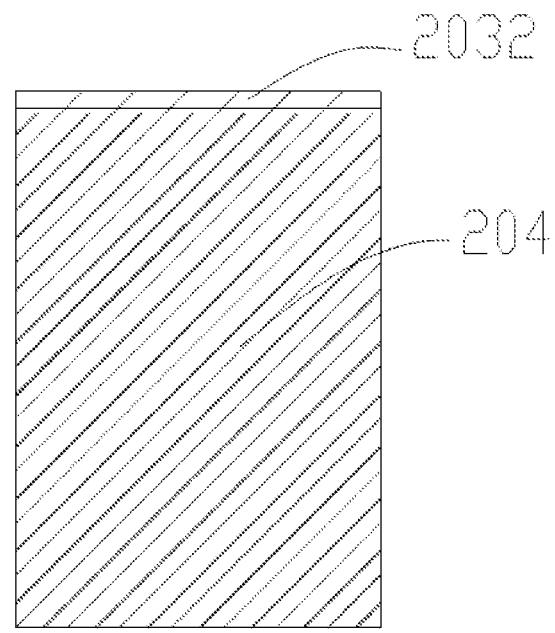
FIG. 10 is a schematic view showing the stacked diffuser and the top/down prism sheets in accordance with one embodiment.

Referring to FIG. 10, the down prism sheet 205 and the top prism sheet 204 are stacked on the first overlapped portion 2031 in sequence, and the first extended portion 2032 extends outward from an edge of the first overlapped portion 2031.

Referring to FIG. 6, on the first end of the diffuser 203, black single-sided glue 207 is adhered to the first extended portion 2032. The air-gap glue 208 is adheres on the fixing board 2012 of the lamp set 201, the plastic frame 206, and the black single-sided glue 207 such that the first end of the diffuser 203 is fixed on the fixing board 2012 and the plastic frame 206. The black single-sided glue 207 and the air-gap glue 208 may block the light beams so as to avoid firefly effect. On the first end of the diffuser 203, an end surface of the top prism sheet 204 facing toward the lamp set 201 aligns with the end surface of the down prism sheet 205 facing toward the lamp set 201 along a vertical direction. That is, the end surfaces of the top prism sheet 204 and the down prism sheet 205 are aligned along a direction perpendicular to the surface of the diffuser 203. Thus, on the first end of the diffuser 203, the light beams emitted by the light guiding plate 202 may be processed by the first extended portion 2032, instead of being emitted out directly. This can avoid the bright lines occurred by the backlit so as to reduce the optical leakage.

Figure 11:
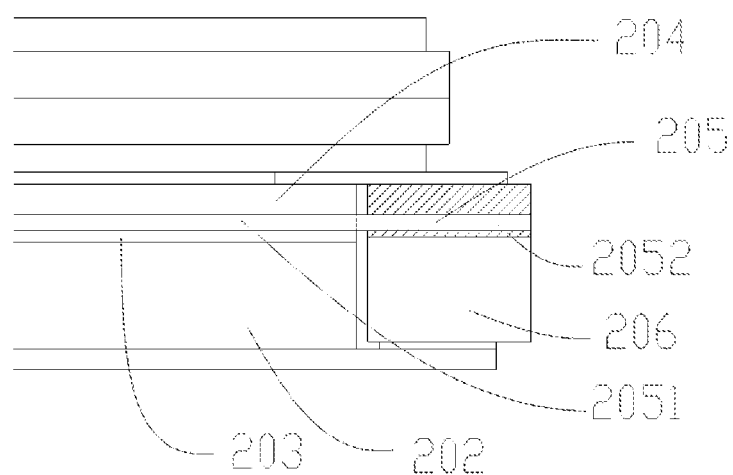
FIG. 11 is a cross-sectional view of the backlight module at the non-LED side.

As shown in FIG. 11, the down prism sheet 205 includes a second overlapped portion 2051 and a second extended portion 2052. The second overlapped portion 2051 is arranged between the diffuser 203 and the top prism sheet 204. The second extended portion 2052 extends outward from the edge of the second overlapped portion 2051. The second extended portion 2052 is fixed on the plastic frame 206 via double-sided glue such that the down prism sheet 205 may be stably fixed.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, comprising:
a lamp set, a light guiding plate, a diffuser, a top prism sheet, a down prism sheet, and a plastic frame, the light guiding plate comprises a light-emitting surface, a back surface opposite to the light-emitting surface, and a lateral surface connecting the light-emitting surface and the back surface, the lamp set is arranged to be close to the lateral surface of the light guiding plate to emit light beams to the light guiding plate, the diffuser, the down prism sheet, and the top prism sheet are stacked on the light-emitting surface in sequence, the diffuser comprises a first end and a second end opposite to each other, the first end of the diffuser is closer to the lamp set than the second end, the diffuser comprises a first overlapped portion and a first extended portion, the down prism sheet and the top prism sheet are stacked on the first overlapped portion, the first extended portion extends outward from an edge of the first overlapped portion to prevent the light beams from the light guiding plate from being leaked via the first end of the diffuser;
wherein the diffuser, the top prism sheet, and the down prism sheet are rectangular and planar;
wherein on the first end of the diffuser, an end surface of the top prism sheet facing toward the lamp set aligns with the end surface of the down prism sheet facing toward the lamp set along a vertical direction;
wherein the lamp set comprises at least one LED and a fixing board for fixing the LED, and the LED is arranged on a lateral surface of the light guiding plate;
wherein the backlight module further comprises a plastic frame for fixing the backlight module, and the first end of the diffuser connects with the fixing board of the lamp set or the plastic frame;
wherein the down prism sheet comprises a second overlapped portion and a second extended portion, the second overlapped portion is arranged between the diffuser and the top prism sheet, the second extended portion extends outward from the edge of the second overlapped portion, and the second extended portion is fixed on the plastic frame via glue.

2. A display device, comprising:
a backlight module comprising a lamp set, a light guiding plate, a diffuser, a top prism sheet, a down prism sheet, and a plastic frame, the light guiding plate comprises a light-emitting surface, a back surface opposite to the light-emitting surface, and a lateral surface connecting the light-emitting surface and the back surface, the lamp set is arranged to be close to the lateral surface of the light guiding plate to emit light beams to the light guiding plate, the diffuser, the down prism sheet, and the top prism sheet are stacked on the light-emitting surface in sequence, the diffuser comprises a first end and a second end opposite to each other, the first end of the diffuser is closer to the lamp set than the second end, the diffuser comprises a first overlapped portion and a first extended portion, the down prism sheet and the top prism sheet are stacked on the first overlapped portion, the first extended portion extends outward from an edge of the first overlapped portion to prevent the light beams from the light guiding plate from being leaked via the first end of the diffuser;

wherein the diffuser, the top prism sheet, and the down prism sheet are rectangular and planar;

wherein on the first end of the diffuser, an end surface of the top prism sheet facing toward the lamp set aligns with the end surface of the down prism sheet facing toward the lamp set along a vertical direction;

wherein the lamp set comprises at least one LED and a fixing board for fixing the LED, and the LED is arranged on a lateral surface of the light guiding plate;

wherein the backlight module further comprises a plastic frame for fixing the backlight module, and the first end of the diffuser connects with the fixing board of the lamp set or the plastic frame;

wherein the down prism sheet comprises a second overlapped portion and a second extended portion, the second overlapped portion is arranged between the diffuser and the top prism sheet, the second extended portion extends outward from the edge of the second overlapped portion, and the second extended portion is fixed on the plastic frame via glue.

* * * * *